(12) United States Patent
Xia et al.

(10) Patent No.: US 8,152,998 B2
(45) Date of Patent: Apr. 10, 2012

(54) SCREENLESS GRANULAR MEDIA FILTERS AND METHODS OF USE

(75) Inventors: Yongming Xia, Kingwood, TX (US); Jeffrey S. Devine, The Woodlands, TX (US)

(73) Assignee: Ashbrook Simon-Hartley, LP, Houston, TX (US)

( * ) Notice: Subject to any disclaimer, the term of this patent is extended or adjusted under 35 U.S.C. 154(b) by 135 days.

(21) Appl. No.: 12/790,416

(22) Filed: May 28, 2010

(65) Prior Publication Data

US 2011/0290734 A1 Dec. 1, 2011

(51) Int. Cl.
*B01D 24/46* (2006.01)

(52) U.S. Cl. ........ 210/189; 210/268; 210/269; 210/290; 210/676; 210/678; 210/786; 210/794

(58) Field of Classification Search .................. None
See application file for complete search history.

(56) References Cited

U.S. PATENT DOCUMENTS

| | | | | |
|---|---|---|---|---|
| 329,185 A * | 10/1885 | Matthiessen | ............... | 210/268 |
| 335,586 A * | 2/1886 | Howes | ................ | 210/268 |
| 395,070 A * | 12/1888 | Moore | ................. | 210/268 |
| 579,039 A * | 3/1897 | Brashear | ............. | 210/189 |
| 650,611 A * | 5/1900 | Reeves | ................ | 210/351 |
| 800,113 A * | 9/1905 | Kassian | ............... | 210/265 |
| 1,007,929 A * | 11/1911 | Deacon et al. | .............. | 210/87 |
| 1,099,396 A * | 6/1914 | Rothwell | ........... | 210/221.2 |
| 1,130,382 A * | 3/1915 | Deacon et al. | .............. | 210/189 |
| 1,179,658 A * | 4/1916 | Rothwell | ............... | 210/85 |
| 1,565,233 A * | 12/1925 | Berntsen | ............... | 210/249 |
| 1,608,661 A * | 11/1926 | Nordell | ................. | 210/676 |
| 1,861,295 A * | 5/1932 | Bramwell | ............... | 210/189 |
| 1,903,612 A * | 4/1933 | Dotterweich | ............. | 210/189 |
| 2,057,887 A * | 10/1936 | Elliott et al. | .............. | 210/786 |
| 2,073,388 A * | 3/1937 | Elliott et al. | .............. | 210/268 |
| 2,348,854 A * | 5/1944 | Schrelber | ............... | 210/618 |
| 2,355,564 A * | 8/1944 | Sebald | .................. | 210/713 |
| 2,468,838 A * | 5/1949 | Rey | ....................... | 210/189 |
| 2,590,148 A * | 3/1952 | Berg | ........................ | 96/109 |
| 2,683,109 A * | 7/1954 | Norris | ................... | 208/166 |
| 2,735,803 A * | 2/1956 | Leffer | .................... | 208/173 |
| 2,742,381 A * | 4/1956 | Donald et al. | ............... | 134/25.5 |
| 2,768,221 A * | 10/1956 | Findlay | ................... | 585/821 |
| 2,863,829 A * | 12/1958 | Henke et al. | ................. | 210/673 |

(Continued)

OTHER PUBLICATIONS

Xia et al., Fluid/Particle Separation Journal, Apr. 1997, pp. 11/2-17/2, vol. 10, No. 1, published by American Filtration and Separation Society, city of publisher unknown.

(Continued)

*Primary Examiner* — Robert James Popovics
(74) *Attorney, Agent, or Firm* — Jeffrey L. Wendt

(57) ABSTRACT

A liquid filtering apparatus is placed in a vessel having a bed of filtration material, the bed comprising at least two different sizes of filter media wherein the filtration material is stratified using upper and lower spaced apart inverted cones so that the unfiltered liquid first contacts coarse grained filtration material and then finer grained filtration material. The apparatus includes an intake for introducing unfiltered liquid that includes a washbox, an airlifting tube extending from the washbox and including an intake end and means for introducing a primary gas to the airlifting tube, the airlifting tube passing through a central pipe, which extends from just below the washbox to a position just above the intake end. The apparatus is devoid of screen cartridges. Methods of filtering and cleaning the filtration material are also disclosed.

20 Claims, 8 Drawing Sheets

U.S. PATENT DOCUMENTS

| | | | | |
|---|---|---|---|---|
| 3,003,641 | A * | 10/1961 | Laughlin | 210/189 |
| 3,019,079 | A * | 1/1962 | Donohue | 423/659 |
| 3,150,063 | A * | 9/1964 | Comte | 202/120 |
| 3,480,542 | A * | 11/1969 | Wilhelm et al. | 210/769 |
| 3,537,582 | A * | 11/1970 | Laszlo | 210/189 |
| 3,550,774 | A * | 12/1970 | Gene et al. | 210/792 |
| 3,556,299 | A * | 1/1971 | Zievers et al. | 210/136 |
| 3,563,385 | A * | 2/1971 | Bykov | 210/268 |
| 3,594,991 | A * | 7/1971 | Berz et al. | 55/294 |
| 3,598,235 | A * | 8/1971 | Demeter | 210/793 |
| 3,667,604 | A * | 6/1972 | Lagoutte | 210/136 |
| 3,679,581 | A * | 7/1972 | Kunz | 210/676 |
| 3,767,048 | A * | 10/1973 | Prengemann | 210/786 |
| 3,798,159 | A * | 3/1974 | Kisbocskoi et al. | 210/786 |
| 3,814,247 | A | 6/1974 | Hirs | |
| 3,853,752 | A * | 12/1974 | Tymoszczuk | 210/618 |
| 3,855,120 | A * | 12/1974 | Garbo | 210/618 |
| 3,878,096 | A * | 4/1975 | Somogyi | 210/110 |
| 3,929,640 | A * | 12/1975 | Dohnert | 210/195.4 |
| 3,953,333 | A * | 4/1976 | Hirs | 210/793 |
| 3,968,034 | A * | 7/1976 | Tymoszczuk | 210/618 |
| 3,987,148 | A * | 10/1976 | Squires | 423/243.08 |
| 3,998,739 | A * | 12/1976 | Morimoto et al. | 210/189 |
| 4,000,066 | A * | 12/1976 | Squires | 210/678 |
| 4,005,016 | A * | 1/1977 | Haese et al. | 210/268 |
| 4,008,159 | A * | 2/1977 | Besik | 210/601 |
| 4,052,300 | A * | 10/1977 | Mosso | 210/786 |
| 4,060,484 | A * | 11/1977 | Austin et al. | 210/786 |
| 4,126,546 | A * | 11/1978 | Hjelmner et al. | 210/741 |
| 4,133,759 | A * | 1/1979 | Ikeda et al. | 210/104 |
| 4,140,497 | A | 2/1979 | Zenz | |
| 4,197,201 | A * | 4/1980 | Hjelmner et al. | 210/189 |
| 4,197,205 | A | 4/1980 | Hirs | |
| 4,202,770 | A * | 5/1980 | Gappa et al. | 210/96.1 |
| 4,238,335 | A * | 12/1980 | Grimsley | 210/802 |
| 4,240,910 | A * | 12/1980 | Stratmann et al. | 210/769 |
| 4,240,911 | A * | 12/1980 | Demeter et al. | 210/794 |
| 4,246,102 | A * | 1/1981 | Hjelmner et al. | 210/704 |
| 4,246,119 | A | 1/1981 | Alldredge | |
| 4,265,767 | A * | 5/1981 | Gappa et al. | 210/662 |
| 4,276,178 | A * | 6/1981 | Gappa et al. | 210/662 |
| 4,330,401 | A * | 5/1982 | Boze et al. | 210/106 |
| 4,340,485 | A * | 7/1982 | Ikeda et al. | 210/675 |
| 4,374,029 | A | 2/1983 | Jaisinghani | |
| 4,399,034 | A * | 8/1983 | Moller | 210/268 |
| 4,441,998 | A * | 4/1984 | Ueda | 210/275 |
| 4,482,457 | A * | 11/1984 | Jacquet | 210/270 |
| 4,482,458 | A * | 11/1984 | Rovel et al. | 210/603 |
| 4,496,464 | A * | 1/1985 | Hensley | 210/792 |
| 4,592,837 | A * | 6/1986 | Ludwig et al. | 210/189 |
| 4,626,359 | A | 12/1986 | Bennett et al. | |
| 4,692,248 | A | 9/1987 | Stannard et al. | |
| 4,707,252 | A * | 11/1987 | Durot et al. | 210/151 |
| 4,720,347 | A * | 1/1988 | Berne | 210/792 |
| 4,787,987 | A * | 11/1988 | Hensley | 210/792 |
| 4,826,609 | A * | 5/1989 | Hensley | 210/792 |
| 4,842,744 | A * | 6/1989 | Schade | 210/636 |
| 4,851,122 | A | 7/1989 | Stanley | |
| 4,861,472 | A * | 8/1989 | Weis | 210/189 |
| 4,869,815 | A * | 9/1989 | Bernard et al. | 210/151 |
| 4,871,459 | A * | 10/1989 | Titoff | 210/519 |
| 4,891,142 | A * | 1/1990 | Hering, Jr. | 210/792 |
| 4,900,434 | A * | 2/1990 | Schade | 210/189 |
| 4,931,183 | A * | 6/1990 | Klein et al. | 210/614 |
| 4,966,698 | A * | 10/1990 | Hensley | 210/269 |
| 5,019,278 | A * | 5/1991 | Jacquet | 210/792 |
| 5,032,276 | A * | 7/1991 | Mackrle et al. | 210/629 |
| 5,112,504 | A * | 5/1992 | Johnson | 210/792 |
| 5,154,824 | A * | 10/1992 | Anderson | 210/274 |
| 5,171,443 | A * | 12/1992 | Bratten | 210/280 |
| 5,173,194 | A * | 12/1992 | Hering, Jr. | 210/792 |
| 5,198,105 | A | 3/1993 | Kauling et al. | |
| 5,207,905 | A * | 5/1993 | O'Brien et al. | 210/274 |
| 5,217,609 | A * | 6/1993 | Holdeman | 210/207 |
| 5,252,230 | A * | 10/1993 | Dunkers | 210/792 |
| 5,277,829 | A * | 1/1994 | Ward | 210/792 |
| 5,350,505 | A | 9/1994 | Tang | |
| 5,372,712 | A * | 12/1994 | Petit | 210/151 |
| 5,407,574 | A * | 4/1995 | Hensley | 210/269 |
| 5,433,862 | A * | 7/1995 | Batson | 210/702 |
| 5,441,634 | A * | 8/1995 | Edwards | 210/194 |
| 5,449,453 | A | 9/1995 | Tang | |
| 5,454,959 | A * | 10/1995 | Stevens | 210/792 |
| 5,458,788 | A | 10/1995 | Tang | |
| 5,462,654 | A * | 10/1995 | Hering, Jr. | 210/97 |
| 5,472,610 | A * | 12/1995 | Jonsson | 210/617 |
| 5,474,585 | A * | 12/1995 | Geibel et al. | 55/302 |
| 5,514,284 | A | 5/1996 | Uban et al. | |
| 5,520,804 | A * | 5/1996 | Ward | 210/189 |
| 5,543,037 | A * | 8/1996 | Hering, Jr. | 210/104 |
| 5,549,827 | A * | 8/1996 | Batson | 210/519 |
| 5,565,098 | A * | 10/1996 | Vellinga | 210/188 |
| 5,573,663 | A * | 11/1996 | Junius et al. | 210/189 |
| 5,573,671 | A * | 11/1996 | Klein | 210/617 |
| 5,582,722 | A * | 12/1996 | Wachinski et al. | 210/189 |
| 5,630,936 | A * | 5/1997 | Oyzboyd | 210/195.3 |
| 5,635,080 | A * | 6/1997 | Hensley | 210/792 |
| 5,653,181 | A * | 8/1997 | Yang et al. | 110/216 |
| 5,681,472 | A * | 10/1997 | Jonsson et al. | 210/618 |
| 5,695,712 | A | 12/1997 | Kumar et al. | |
| 5,698,106 | A * | 12/1997 | Larsson et al. | 210/675 |
| 5,707,523 | A | 1/1998 | Temple | |
| 5,730,886 | A * | 3/1998 | Wachinski et al. | 210/792 |
| 5,746,913 | A * | 5/1998 | Chang et al. | 210/189 |
| 5,755,959 | A * | 5/1998 | Jonsson et al. | 210/189 |
| 5,766,488 | A | 6/1998 | Uban et al. | |
| 5,843,308 | A * | 12/1998 | Suozzo et al. | 210/195.1 |
| 5,895,567 | A * | 4/1999 | Van Der Herberg | 210/97 |
| 5,945,005 | A * | 8/1999 | Junius et al. | 210/786 |
| 5,976,365 | A * | 11/1999 | Petit | 210/151 |
| 5,993,650 | A * | 11/1999 | Kim | 210/150 |
| 6,035,892 | A | 3/2000 | Kennedy | |
| 6,048,459 | A * | 4/2000 | Khudenko | 210/617 |
| 6,063,720 | A | 5/2000 | Kumar et al. | |
| 6,074,549 | A * | 6/2000 | Cochrane et al. | 208/391 |
| 6,077,426 | A * | 6/2000 | Grabowski | 210/189 |
| 6,077,446 | A * | 6/2000 | Steiner et al. | 210/760 |
| 6,103,109 | A * | 8/2000 | Noyes et al. | 210/151 |
| 6,143,186 | A * | 11/2000 | Van Unen | 210/786 |
| 6,159,365 | A * | 12/2000 | Kigel et al. | 210/151 |
| 6,171,498 | B1 * | 1/2001 | Fassbender et al. | 210/512.1 |
| 6,319,396 | B1 * | 11/2001 | Heagey | 210/151 |
| 6,319,413 | B1 * | 11/2001 | Xia et al. | 210/676 |
| 6,326,191 | B2 * | 12/2001 | VanToever | 435/299.1 |
| 6,328,892 | B1 * | 12/2001 | Jones | 210/605 |
| 6,334,956 | B1 * | 1/2002 | Hanemaaijer | 210/656 |
| 6,361,701 | B1 * | 3/2002 | Schade | 210/786 |
| 6,364,179 | B1 | 4/2002 | Sullivan | |
| 6,365,044 | B1 * | 4/2002 | Crane | 210/248 |
| 6,387,283 | B1 * | 5/2002 | Lind | 210/786 |
| 6,413,427 | B2 * | 7/2002 | Tipton et al. | 210/605 |
| 6,426,005 | B1 * | 7/2002 | Larsson | 210/650 |
| 6,471,857 | B1 * | 10/2002 | Kaibara | 210/189 |
| 6,517,712 | B2 * | 2/2003 | Xia et al. | 210/189 |
| 6,527,948 | B2 * | 3/2003 | Haridas et al. | 210/151 |
| 6,531,058 | B1 * | 3/2003 | Josse et al. | 210/151 |
| 6,617,155 | B1 * | 9/2003 | Van Toever | 435/297.1 |
| 6,630,071 | B1 * | 10/2003 | Buisman et al. | 210/610 |
| 6,641,737 | B2 * | 11/2003 | Xia et al. | 210/676 |
| 6,716,344 | B1 * | 4/2004 | Bassi et al. | 210/189 |
| 6,733,662 | B2 * | 5/2004 | Pollock | 210/97 |
| 6,780,312 | B2 * | 8/2004 | Saito | 210/189 |
| 6,790,351 | B2 * | 9/2004 | Xia et al. | 210/189 |
| 6,874,644 | B1 * | 4/2005 | Wagener et al. | 210/513 |
| 6,881,350 | B2 * | 4/2005 | Wilson | 210/788 |
| 6,966,987 | B1 * | 11/2005 | Morgan et al. | 210/279 |
| 7,018,530 | B2 * | 3/2006 | Pollock | 210/194 |
| 7,147,781 | B2 * | 12/2006 | Gordic | 210/618 |
| 7,160,452 | B2 * | 1/2007 | Saito | 210/270 |
| 7,368,059 | B2 * | 5/2008 | Drake | 210/676 |
| 7,381,336 | B2 * | 6/2008 | Stedman | 210/741 |
| 7,399,416 | B2 * | 7/2008 | Moller et al. | 210/673 |
| 7,445,721 | B2 * | 11/2008 | Moller | 210/760 |
| 7,553,418 | B2 * | 6/2009 | Khudenko et al. | 210/601 |
| 7,666,302 | B2 * | 2/2010 | Jenkins | 210/150 |
| 7,713,423 | B2 * | 5/2010 | Moller et al. | 210/667 |
| 7,713,426 | B2 * | 5/2010 | Newcombe | 210/748.01 |

| | | | | |
|---|---|---|---|---|
| 7,744,764 B2 * | 6/2010 | Moller et al. | | 210/661 |
| 7,862,715 B2 * | 1/2011 | Drake | | 210/189 |
| 7,897,040 B2 * | 3/2011 | Newcombe et al. | | 210/108 |
| 7,972,509 B2 * | 7/2011 | Newcombe et al. | | 210/269 |
| 8,012,359 B2 * | 9/2011 | Parkinson | | 210/786 |
| 8,070,963 B2 * | 12/2011 | Bomze | | 210/741 |
| 8,071,055 B2 * | 12/2011 | Newcombe | | 422/534 |
| 2002/0023885 A1 * | 2/2002 | Lind | | 210/792 |
| 2002/0036164 A1 * | 3/2002 | Xia et al. | | 210/263 |
| 2002/0162795 A1 * | 11/2002 | Pollock | | 210/621 |
| 2003/0066792 A1 * | 4/2003 | Xia et al. | | 210/189 |
| 2004/0050762 A1 * | 3/2004 | Xia et al. | | 210/189 |
| 2004/0074836 A1 * | 4/2004 | Long | | 210/435 |
| 2004/0104183 A1 * | 6/2004 | Wilson | | 210/801 |
| 2004/0144728 A1 * | 7/2004 | Moller et al. | | 210/688 |
| 2005/0077247 A1 * | 4/2005 | Stedman | | 210/741 |
| 2005/0115880 A1 * | 6/2005 | Pollock | | 210/194 |
| 2005/0173348 A1 * | 8/2005 | Drake | | 210/676 |
| 2006/0000785 A1 * | 1/2006 | Moller | | 210/760 |
| 2006/0261010 A1 * | 11/2006 | Drake | | 210/670 |
| 2007/0187329 A1 * | 8/2007 | Moller et al. | | 210/670 |
| 2008/0099413 A1 * | 5/2008 | Tolley et al. | | 210/793 |
| 2008/0257807 A1 * | 10/2008 | Parkinson | | 210/175 |
| 2008/0277349 A1 * | 11/2008 | Moller et al. | | 210/673 |
| 2008/0302726 A1 * | 12/2008 | Moller et al. | | 210/661 |
| 2009/0071909 A1 * | 3/2009 | Newcombe et al. | | 210/739 |
| 2009/0101568 A1 * | 4/2009 | Donaque et al. | | 210/288 |
| 2009/0178980 A1 * | 7/2009 | Newcombe | | 210/748 |
| 2010/0133196 A1 * | 6/2010 | Khudenko | | 210/668 |
| 2011/0024369 A1 * | 2/2011 | Reekers | | 210/786 |
| 2011/0100888 A1 * | 5/2011 | Newcombe et al. | | 210/189 |
| 2011/0100925 A1 * | 5/2011 | Newcombe et al. | | 210/739 |
| 2011/0147321 A1 * | 6/2011 | Oz | | 210/793 |
| 2011/0240562 A1 * | 10/2011 | Bomze | | 210/741 |
| 2011/0290734 A1 * | 12/2011 | Xia et al. | | 210/676 |

OTHER PUBLICATIONS

Xia, "The Application of the Dual Media Concept to Upflow Filtration", Water Treatment, Apr. 1989, vol. 4, No. 2, China Ocean Press—Beijing.

* cited by examiner

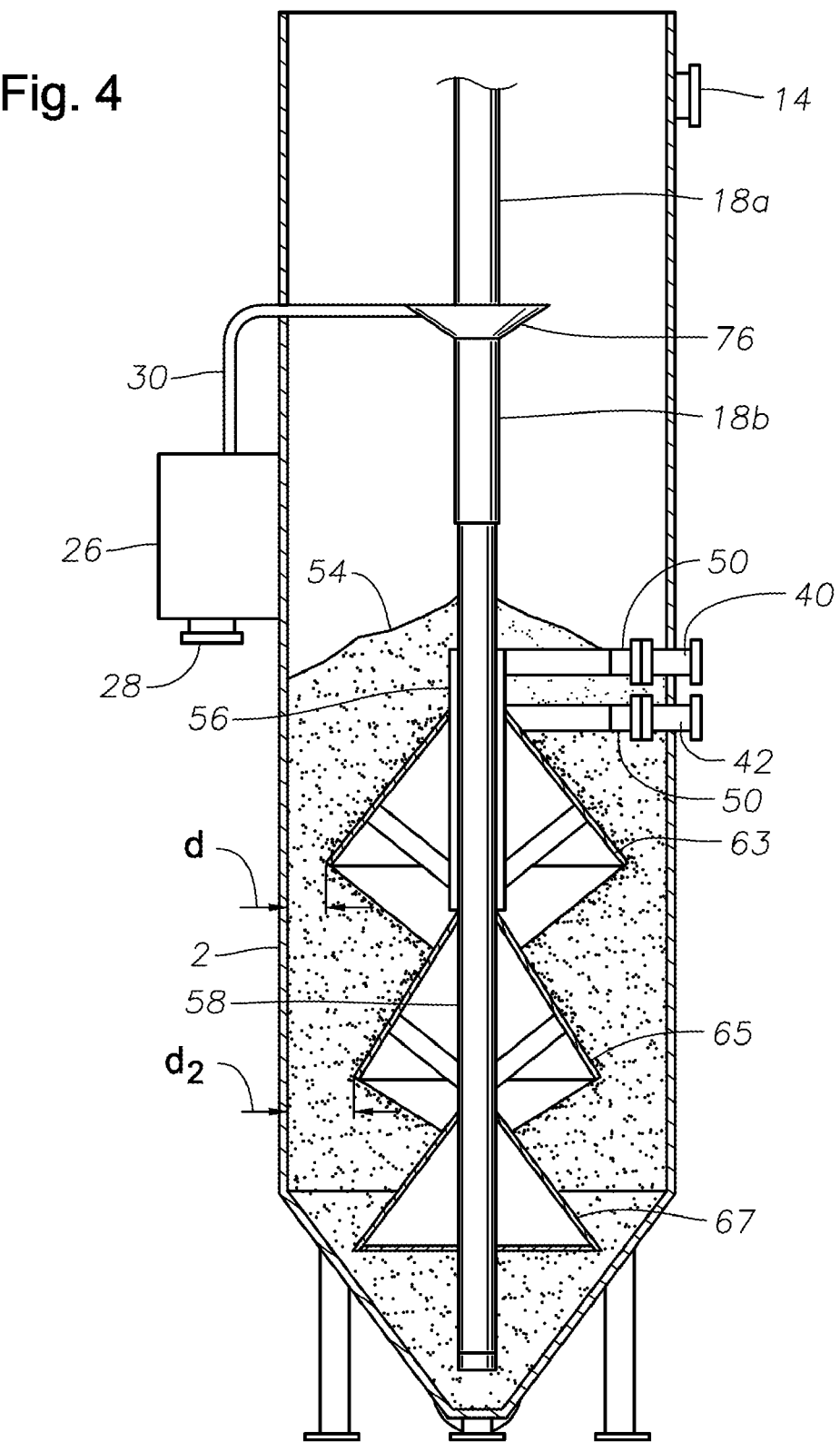

SCREENLESS GRANULAR MEDIA FILTERS AND METHODS OF USE

BACKGROUND

1. Field of the Disclosure

This disclosure relates to an apparatus and method for filtering liquids containing suspended solids. Specifically, this disclosure relates to an improved vertical filtration unit.

2. Description of Related Art

The removal of suspended solids from liquids, especially water, has been a longstanding requirement for many uses of such liquids. For example, water, which is free of suspended solids, is greatly preferred for uses, such as drinking, industrial processing, and swimming pools. Vertical filters, which utilize filter media, such as sand and garnet, have been used to separate suspended solids from water.

Vertical filters operate by introducing the liquid containing suspended solids onto the top portion of a bed of filter media. As the liquid passes through the filter media under the force of gravity, the suspended solids adhere to the filter media and/or to solids accumulated on the filer media, allowing liquid essentially free of suspended solids to flow through one or more screen cartridges prior to accumulating in an effluent chamber and then exit from the filtration unit.

The above-described method, although effective at removing suspended solids from liquids, has several shortcomings. The filter media eventually becomes saturated with suspended solids and no longer effectively removes suspended solids from the incoming liquid. When this condition occurs, the vertical filtration unit must cease operation so that the captured suspended solids can be removed from the filter media. This removal is accomplished through an operation referred to as "backwashing," in which clean liquid is introduced, under pressure, to the bottom of the filter media bed and passes through the filter media in the reverse direction from the filtration process. The reverse flow of the liquid removes the filtered solids from the filter media and exits the vertical filter. This operation is typically continued until the exiting backwash water is essentially free of suspended solids, indicating that the filter media is clean. Backwashing can be very time consuming and generates large volumes of wastewater. Additionally, filtered solids are never completely removed from the filter media during backwashing, which eventually results in the filter media needing to be replaced. Filtration devices utilizing the above method are disclosed in U.S. Pat. No. 650,611.

The problem of backwashing filter media has been addressed, to some extent, through the development of continuous or moving bed filtration systems. While these continuous filtration systems operate to remove suspended solids as outlined above, they have the added benefit of continuously removing filtered suspended solids from the filter media. Examples of continuous filtration systems and various improvements thereon are disclosed and explained in U.S. Pat. Nos. 4,060,484; 4,891,142; 5,582,722; 5,730,886; 6,319,413; 6,517,712; 6,641,737; 6,790,351 all of which are herein incorporated by reference. See also the following articles: "Deep Moving Bed Downflow Sand Filter—An Optimum Granular Media Filter for Wastewater Treatment" American Filtration Society, Volume 10, 1996; and "The Application of Dual Media Concept to Upflow Filtration", Water Treatment, Volume 4, No. 2, April 1989.

The above-described continuous systems for the filtration of liquids and the removal of suspended solid granules are typically not as effective or efficient as industry desires. One problem that remains is the corrosion of metallic screens in the screen cartridges, for example when brines are processed in a vertical granular media filter such as described above. While various plastic screens have tried, they have met with limited success, primarily due to insufficient strength of plastic screens, and the added cost of engineering special screens for specific applications. Therefore, there remains an unmet need to provide reliable, maintenance-free, continuous, self-cleaning, vertical filtration units for the removal of suspended solids from liquids that may be corrosive to metallic components, such as metallic screens in screen cartridges.

SUMMARY

In one aspect, the present disclosure comprises a continuous, self-cleaning liquid filtering apparatus comprising:

a vessel having a bed of filtration material, an intake for introducing unfiltered liquid into an upper region of the vessel, a washbox assembly comprising an airlifting tube extending from the washbox comprising an expulsion end within the washbox and an intake at a lower end opposite from the washbox, a reject outlet pipe communicating the washbox with a reject box;

a central pipe extending along an outside surface of the airlifting tube from a position just below the washbox to a position just above the intake end;

an effluent riser pipe extending along an outside surface of the central pipe from a position just below the washbox to a position above the intake end;

first and second effluent chambers, the first effluent chamber defined by an outer surface of the effluent riser pipe, a bottom plate of an upper inverted cone, and an inner surface of the upper inverted cone, and the second effluent chamber defined by an outer surface of the central pipe, a bottom plate of a lower inverted cone, and an inner surface of the lower inverted cone, the upper and lower inverted cones being substantially concentric and vertically spaced apart components of a baffle assembly, the upper inverted cone connected to the outer surface of the effluent riser pipe and fluidly connected to the first effluent chamber, the lower inverted cone connected nearer to the bottom of the effluent riser pipe than the upper inverted cone and fluidly connected to the second effluent chamber;

an effluent collector communicating the effluent chambers with a location outside of the liquid filtering apparatus; and a deflector connected either to an internal surface of the vessel or to a lower periphery of the lower invert cone, a flow region being defined between the deflector and lower periphery of the lower inverted cone.

In certain embodiments the granular filtration material moves downward, and the apparatus of this disclosure may be characterized as screenless downflow moving bed filters. In certain apparatus the liquid filtering apparatus the filtration material is stratified so that the unfiltered liquid first contacts coarse grained (larger average granule size) filtration material and then finer grained (smaller average granule size) filtration material, and then the finest grained filtration material. In certain apparatus, the finest filtration material is selected from the group consisting of sand, anthracite, ceramic beads and granular activated carbon, and the finer grained filtration material is one or more species of garnet. In yet other apparatus, the species of garnet may be selected from the group consisting of minerals within the general formula:

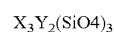

and combination thereof, wherein
X is a divalent cation selected from the group consisting of $Ca^{2+}$, $Mg^{2+}$, and $Fe^{2+}$, and
Y is a trivalent cation selected from the group consisting of $Al^{3+}$, $Fe^{3+}$, and $Cr^{3+}$.

In certain embodiments, the stratification of granular filter media is such that the finer grained filtration material is positioned between the coarse grained filtration material and outside surfaces of the vertically spaced apart upper and lower inverted cones. The coarse grained filtration material comprises sand of gradually diminishing granule size, starting from coarsest sand at an initial fluid contact layer having granule size not less than 0.5 mm, the sand grains progressively becoming smaller to a granule size of not less than 0.3 mm and not more than 3.0 mm. The finer grained filtration material may comprise one or more species of garnet of gradually diminishing granule size, starting from coarsest garnet having granule size not less than 0.15 mm, the garnet grains progressively becoming smaller to a granule size of not less than 0.1 mm and not more than 1.0 mm.

In certain embodiments, the deflector is connected to the inner surface of the vessel and slanted or inclined downward from a position near the inner surface of the vessel and extending toward but not touching the lower periphery of the lower inverted cone. In yet other embodiments, the deflector is connected to the lower periphery of the lower inverted cone and slanted or inclined upward from a position near the inner surface of the vessel and extending toward but not touching the inner surface of the vessel. The deflector may have a deflector angle "$\alpha$" ranging from about 45 to about 55 degrees, or from about 48 to about 54 degrees, or from about 50 to about 54 degrees, and in certain embodiments about 52 degrees (as measured in reference to horizontal, as illustrated herein). In embodiments where the deflector is connected to the inner surface of the vessel and slanted downward from a position near the inner surface of the vessel and extending toward but not touching the lower periphery of the lower inverted cone, an upper terminus of the deflector may be positioned a distance "$g_1$" about 0.5 to about 2 inches away from the inside surface of the vessel, or from about 1 to about 2 inches, or from about 1 to about 1.5 inches away from the inside surface of the vessel. In these embodiments, a lower terminus of the deflector may be positioned horizontally away from the peripheral edge of the lower inverted cone by a distance "$g_2$" ranging from about 0.5 to about 1.5 inches, or from about 0.8 to about 1.2 inches. Also, the lower terminus of the deflector may be separated from the plane of the lower inverted cone by a distance "$g_3$" ranging from about 2 to about 3 inches, or from about 2.3 to about 2.6 inches. The distances $g_1$, $g_2$, and $g_3$ are carefully selected to ensure the stratification of the filter material. The slanted or inclined deflector is primarily positioned in a region or regions of the filter vessel where the coarser granular filtration media is downwardly moving, which are generally near the inside vessel surface.

In certain embodiments, the upper and lower inverted cones may have their peripheral edges positioned away from the inside surface of the vessel distances defines by "d" and "$d_2$", respectively, the upper inverted cone peripheral edge located closer to the inside surface of the vessel than is the peripheral edge of the lower inverted cone, so that the ratio $d/d_2$ ranges from about 0.6 to about 0.95, or from about 0.7 to about 0.9, or from about 0.8 to about 0.9. In certain embodiments the upper inverted cone may have a cone angle "$\beta$" (relative to vertical) ranging from about 35 to about 45 degrees, or from about 36 to about 40 degrees. In certain embodiments the lower inverted cone may have a cone angle "$\gamma$" (relative to vertical) ranging from about 25 to about 35 degrees, or from about 28 to about 32 degrees. It is important that $\beta > \gamma$ to ensure proper stratification of the filter material, in conjunction with the various distances and gaps referred to herein.

In certain embodiments the washbox comprises a filter media shield hood attached to an upper portion of the washbox, above the expulsion end of the airlifting tube, a washbox skirt below the filter media shield hood, a washbox isolator at the bottom of the washbox skirt, and at least one inlet tube at a bottom portion of the washbox skirt. The washbox may further comprise a target plate below the filter media shield hood and above the washbox skirt. The filter media shield hood may be an airlift return cap. The washbox may further comprise a porous separation cone below the filter media shield, a dirtied liquid reject collection tray below the separation cone, and a second reject outlet pipe communicating the dirtied liquid reject collection tray with the reject box. The reject outlet pipe may include at least one valve, and the effluent collector may include at least one valve. The latter valve may be a telescoping valve.

In certain embodiments the reject box comprises a weir volume space defined by a bottom side, a riser side and a weir plate, an outlet side comprising an outlet, and a vertical pipe communicating with the weir volume space by way of a riser outlet. The height of the weir plate may be adjusted to vary the volume of the weir volume space, and the weir plate may comprise a V-shaped notch along a top side of the weir plate.

In certain embodiments, the effluent collector is positioned above the upper inverted cone, and the airlifting tube is disposed in a generally centered position within the central pipe by way of one or more internal guide vanes.

In certain embodiments, the vessel is an existing basin with no installed piping, and the liquid filtering apparatus is retrofitted to the existing basin, and no holes are cored into the existing basin.

In certain embodiments, the depth of the filtration material above the upper inverted cone is at least 40 inches (102 cm).

In certain embodiments, the apparatus further comprises a sand cone attached to the central pipe below the lower inverted cone and terminating above the intake end of the airlifting tube, the sand cone having a sand cone space defined by a bottom of the filter vessel, an inner surface of the sand cone, a sand cone bottom plate, and the outer surface of the central pipe. In certain apparatus, the sand cone has an outer peripheral edge that is positioned a distance $d_1$ from the inside surface of the vessel, where $d_1$ ranges from about 1 to about 3 inches, or from about 1.5 to about 3 inches, or from about 2 to about 3 inches, and in certain embodiments about 2.5 inches. In certain embodiments the sand cone may have a cone angle "$\rho$" (relative to vertical) ranging from about 35 to about 45 degrees, or from about 36 to about 40 degrees.

In certain embodiments, the liquid filtering apparatus further comprises silt tubes connecting a bottom portion of the lower inverted cone and the sand cone space. In certain embodiments, the liquid filtering apparatus comprises a sand cone flush tube extending from the sand cone space to an area above the effluent collector. In certain embodiments, the liquid filtering apparatus comprises a back flush pipe extending from the effluent collector at a point between the effluent chamber and the valve to a point above the washbox skirt. The effluent collector may be connected to an effluent header. The apparatus may comprise a pipe extending from the outlet of the reject box to a reject manifold.

Methods of filtering liquid are also presented in this disclosure. One method includes the steps of:
(a) placing a liquid filtering apparatus in a vessel having a bed of filtration material and introducing unfiltered liquid into an upper region of the vessel, the bed comprising at least two different sizes of filter media wherein the filtration material is stratified using upper and lower spaced apart inverted cones so that the unfiltered liquid first contacts coarse grained filtration material and then finer grained filtration material;

(b) filtering the unfiltered liquid through the bed in a downward direction employing a deflector connected either to an internal surface of the vessel or to a lower periphery of the lower inverted cone, a flow region being defined between the deflector and lower periphery of the lower inverted cone;

(c) collecting filtered liquid in and conveying the filtered liquid upward into an effluent chamber without benefit of any screen;

(d) removing the filtered liquid from the effluent chamber by way of an effluent collector;

(e) withdrawing a mixture of filtered liquid and dirtied filtration material from a lower portion of the bed of filtration material by way of an airlifting tube;

(f) washing the dirtied filtration material by deflecting the mixture off of a surface and separating the dirt from the filtration material;

(g) collecting the dirt and liquid separated in step (f) and removing it by way of a reject line; and (h) depositing the washed filtration material to the top of the bed of filtration material.

Liquid filter assemblies are also considered a part of this disclosure, wherein two or more of the liquid filtering apparatus described above are included. Apparatus and methods of this disclosure will become more apparent upon review of the brief description of the drawings, the detailed description of the disclosure, and the claims that follow.

BRIEF DESCRIPTION OF THE DRAWINGS

The manner in which the objectives of this disclosure and other desirable characteristics can be obtained is explained in the following detailed description and drawings included herein in which:

FIGS. 4 and 5 are schematic side elevation views, partially in section, of certain internal features of the embodiment of FIGS. 1-3;

Figure 1:
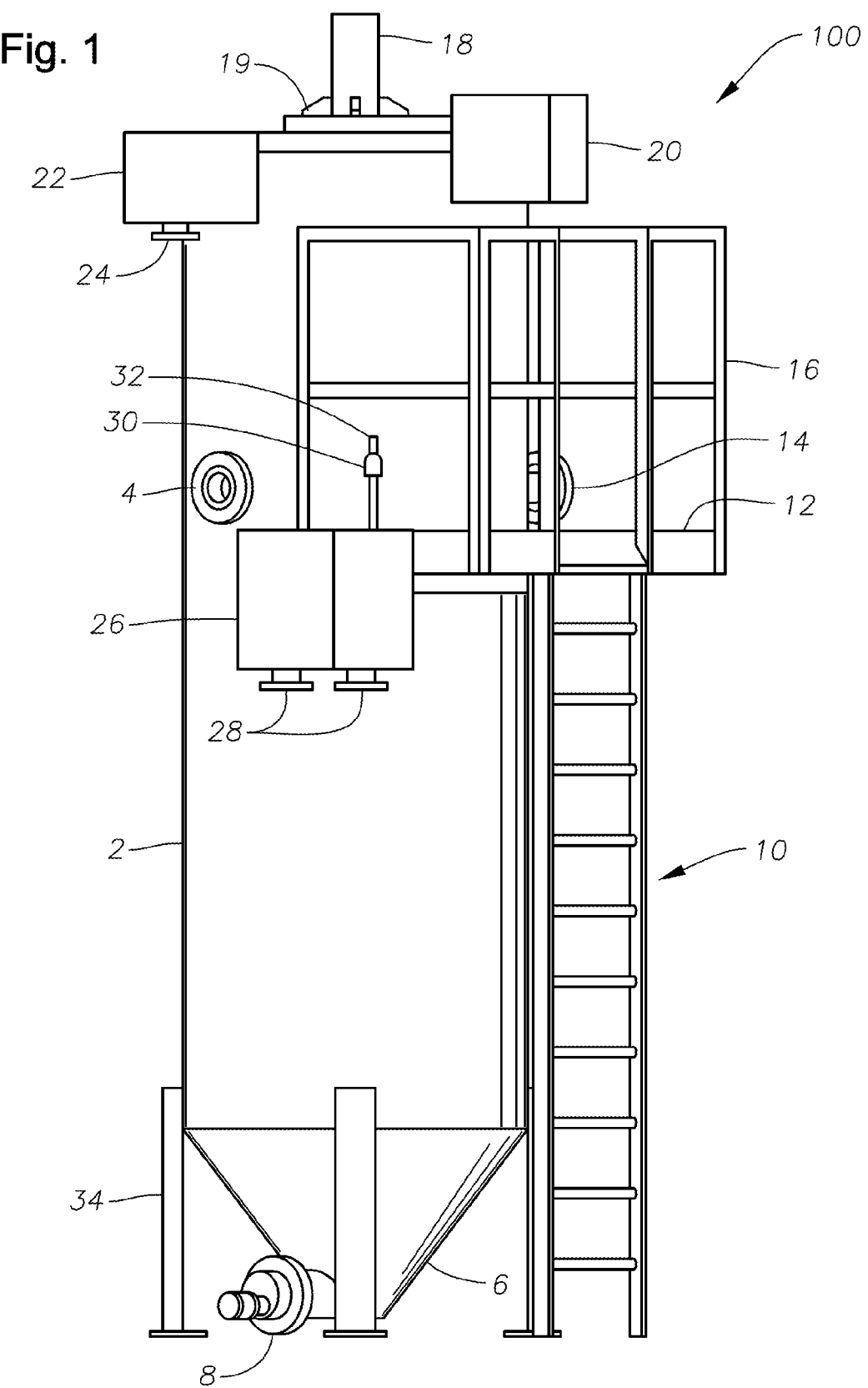
FIGS. 1 and 2 are schematic side elevation views of a filter apparatus of the present disclosure illustrating external components.

It is to be noted, however, that the appended drawings are not to scale and illustrate only typical embodiments of this disclosure, and are therefore not to be considered limiting of its scope, for other equally effective embodiments may become apparent after reading this disclosure.

DETAILED DESCRIPTION

In the following description and accompanying drawings, like reference numbers, as used in the various figures, refer to like features or elements. Terms, such as upper, lower, inner, and outer, refer to the orientation of a given element as shown in the drawings.

Various numerical ranges are disclosed herein. Because these ranges are continuous, they include every value between the minimum and maximum values. Unless expressly indicated otherwise, the various numerical ranges specified in this application are approximations.

The novel screenless continuous cleaning granular media filters and methods described herein employ, in certain embodiments, two filter media: a coarse granular media and a fine granular media, for example sand as the coarse granular media and garnet as the fine granular media. In these embodiments, the garnet grain employed is much smaller than the sand grains in the filter bed. The mixed media will be stratified in the filter bed based on filter media grain size, with the larger grains being generally located near the outside of the bed (near the vessel wall), and the finer grains being located closer to the central region of the bed. The filtration apparatus comprises a baffle system that enhances this stratification, and the filtration methods are generally force the influent, dirty fluids to flow through coarse sand first, followed by fine sand, and then to finest garnet. The finest garnet is located in filter polishing zone. This ensures the filter will produce excellent quality filter effluent. Another key feature is the absence of effluent screens. This feature eliminates the potential of screen fouling, and may reduce the overall capital and/or operating cost of the filters described herein.

Figure 2:
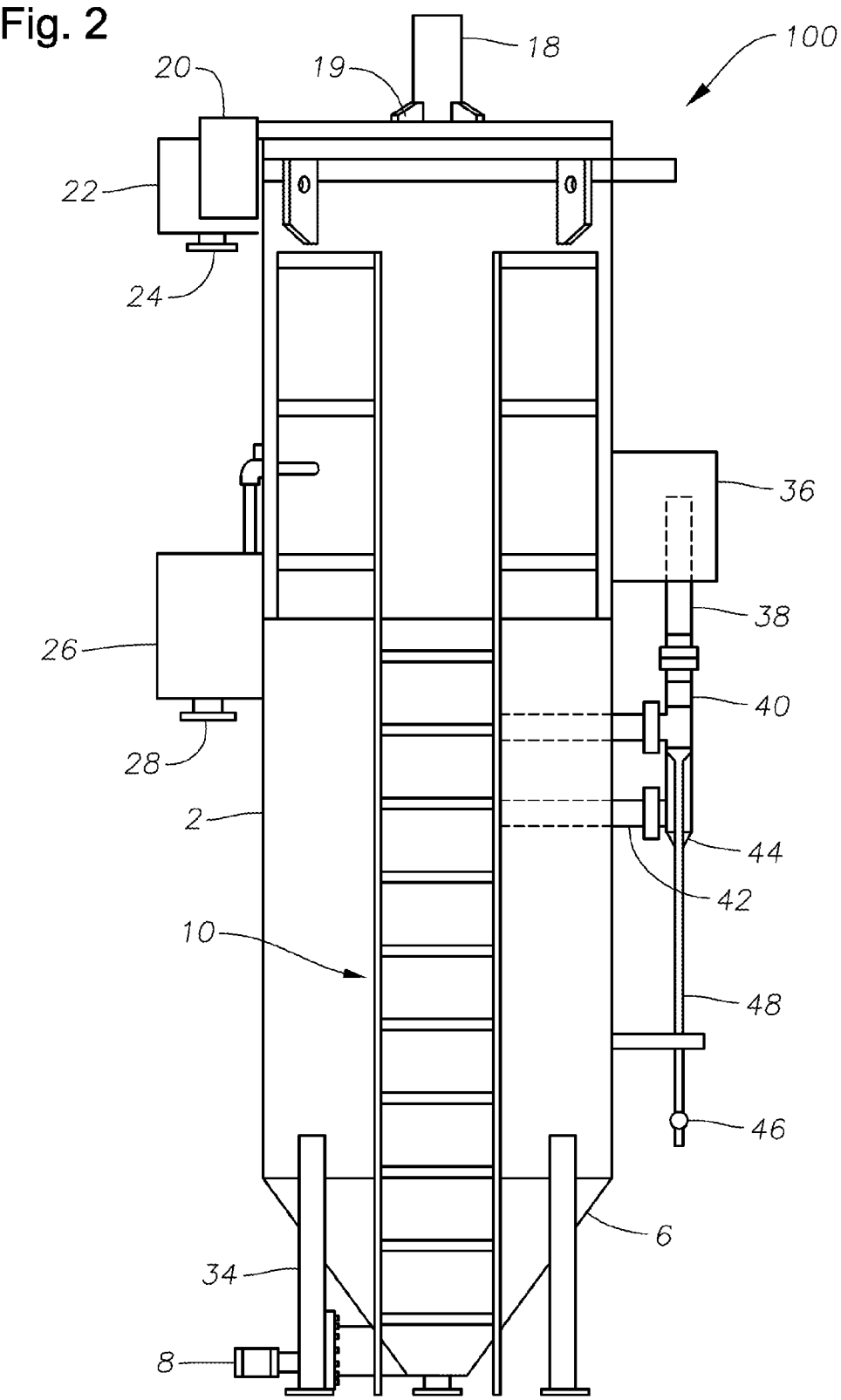

Referring now to the drawing figures, FIGS. 1 and 2 are schematic side elevation views of a filter apparatus of the present disclosure illustrating external components. First filter embodiment 100 of the present disclosure includes a vessel 2, which is defined by cylindrical sidewalls. While vessel 2 is depicted as cylindrical in cross section, it may be square or some other cross-sectional configuration. Vessel 2 has a water or wastewater influent connection 4, and a conical bottom 6, which has a drain conduit/valve 8. Embodiment 100 also includes a vertical access ladder 10, a generally horizontal work platform 12 having a safety railing system 16. Vessel 2 also includes an effluent connection 14, a washbox weldment 18, and washbox support 19. Embodiment 100 further includes an air control panel 20, an overflow box 22 and overflow conduit 24, a reject box 26 and a reject conduit 28. Embodiment 100 also includes a reject pipe nipple 30 and valve 32, as well as vessel supports 34 (four in this embodiment). FIG. 2 illustrates further features of embodiment 100, including an effluent box 36, an effluent header or main conduit 38, and first and second effluent headers 40 and 42. An effluent weldment 44 is provided, as well as a valve 46 and drain conduit 48, which may be used for draining operations. Operation of the features described so far is known in the art.

Figure 3:
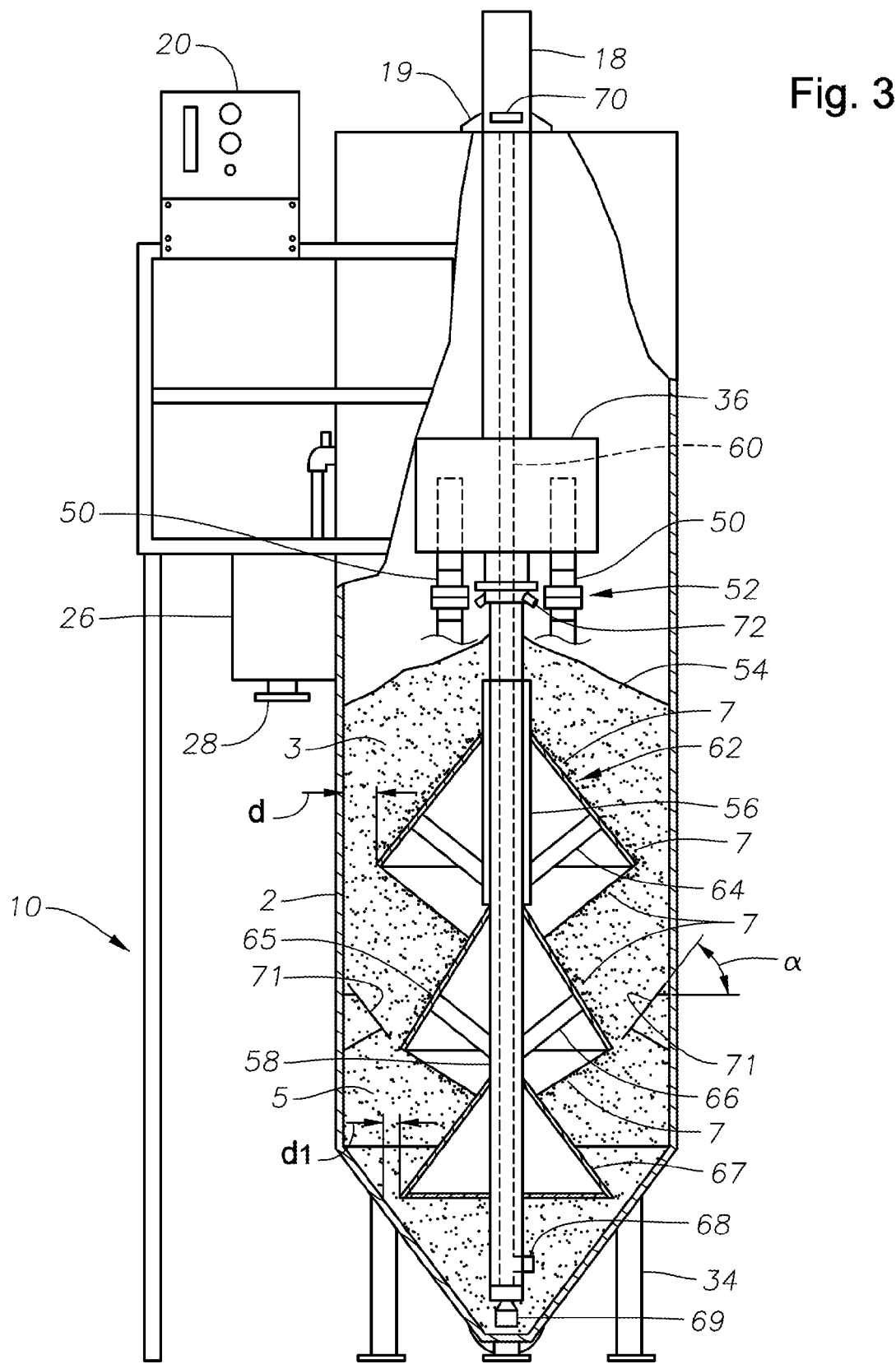
FIGS. 3 and 3A are schematic side elevation views, partially in section, with parts broken away to illustrate certain internal features of the filter apparatus of FIGS. 1 and 2.
Figure 3A:
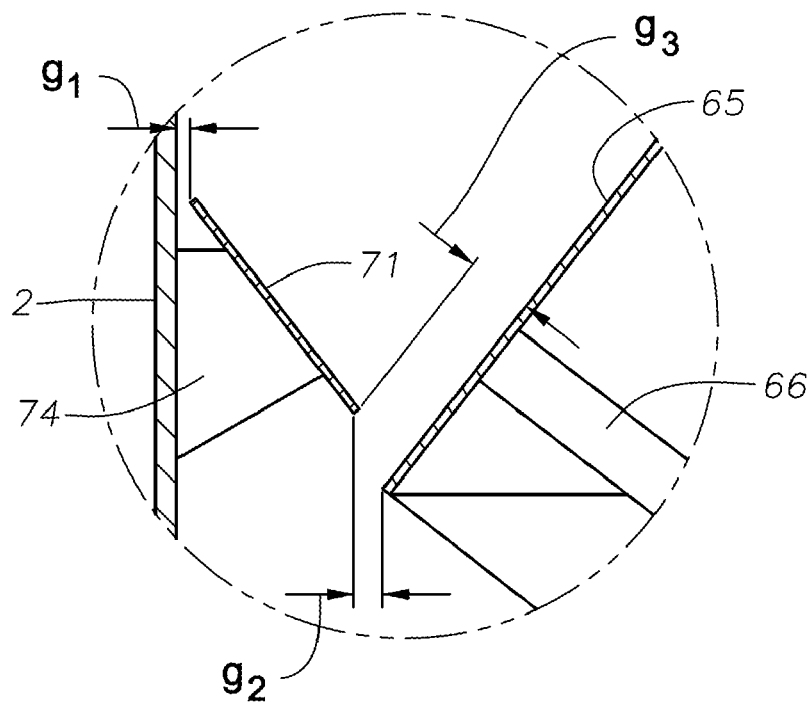

FIGS. 3 and 3A are schematic side elevation views, partially in cross-section, with parts broken away to illustrate certain internal features of filter apparatus embodiment 100 of FIGS. 1 and 2. Dual flexible couplings 50 fluidly connect effluent conduits 40, 42 to vessel 2, and include corresponding effluent valves 52. Vessel 2 contains a bed of granular filter media 3, and which is stratified as described herein. The filter media bed may have a double tapered conical shape and an unfiltered liquid descends downwardly through the filter media bed 3. Enhanced filtration is accomplished if the granule size of the filter media bed 3 is coarser, or larger at the outer area, becoming finer, or smaller toward the middle and center of the filter media bed 3.

The upper conical configuration 54 of filter media bed 3 occurs naturally from the operation of filtration apparatus embodiments described herein. As the filter media drops from washbox 18 onto the top of conical pile 54, the granules classify themselves. The larger filter media granules tend to roll down the slope of the cone. The smaller granules, however, tend to descend vertically through the interior of the cone portion. This action results in the preferred, natural conical configuration of the pile.

Embodiment 100 further includes an effluent riser pipe or conduit 56, a central effluent riser pipe or conduit 58, and an airlifting tube 60. Operation of these features is known in the art as well, and reference is made to assignee's previously incorporated by reference U.S. Pat. No. 6,790,351. Embodiment 100 includes a baffle assembly 62 that includes an upper inverted cone 63 and a lower inverted cone 65. Upper inverted cone 63 is supported by supports 64, while lower inverted cone 65 is supported by supports 66. Also included is a sand cone 67 and compressed air inlet 68, as well as a target plate 70. As filtration material grains and the dirt and floc adhered thereto travel up airlifting tube 60 they strike target plate 70, helping to loosen the dirt from the grains of filtration material. Influent jets 72 may be employed to effect a countercurrent flow of clean influent fluid against the falling dirty grains, further cleansing the grains before they drop down on the conical top surface 54 of filter bed 3.

As illustrated generally in FIG. 3, and in more detail in FIG. 3A, in embodiment 100 a deflector plate 71 is connected to the inner surface of vessel 2 via a bracket 74 and slanted downward from a position near the inner surface of vessel 2 and extending toward but not touching a lower periphery of lower inverted cone 65. The deflector may have a deflector angle "α" ranging from about 45 to about 55 degrees, or from about 48 to about 54 degrees, or from about 50 to about 54 degrees, and in certain embodiments about 52 degrees (as measured in reference to horizontal, as illustrated herein). In embodiment 100 where deflector plate 71 is connected to the inner surface of vessel 2 and slanted downward from a position near inner surface of vessel 2 and extending toward but not touching the lower periphery of lower inverted cone 65 (see FIG. 3), an upper terminus of deflector plate 71 may be positioned a distance "$g_1$" ranging from about 0.5 to about 2 inches away from the inside surface of vessel 2, or from about 1 to about 2 inches, or from about 1 to about 1.5 inches away from the inside surface of vessel 2 (see FIG. 3A). In these embodiments, a lower terminus of deflector plate 71 may be positioned horizontally away from the peripheral edge of lower inverted cone 65 by a distance "$g_2$" ranging from about 0.5 to about 1.5 inches, or from about 0.8 to about 1.2 inches. Also, the lower terminus of deflector plate 71 may be separated from the plane of lower inverted cone 65 by a distance "$g_3$" ranging from about 2 to about 3 inches, or from about 2.3 to about 2.6 inches. The distances $g_1$, $g_2$, and $g_3$ are carefully selected to ensure the stratification of the filter material.

Figure 5:
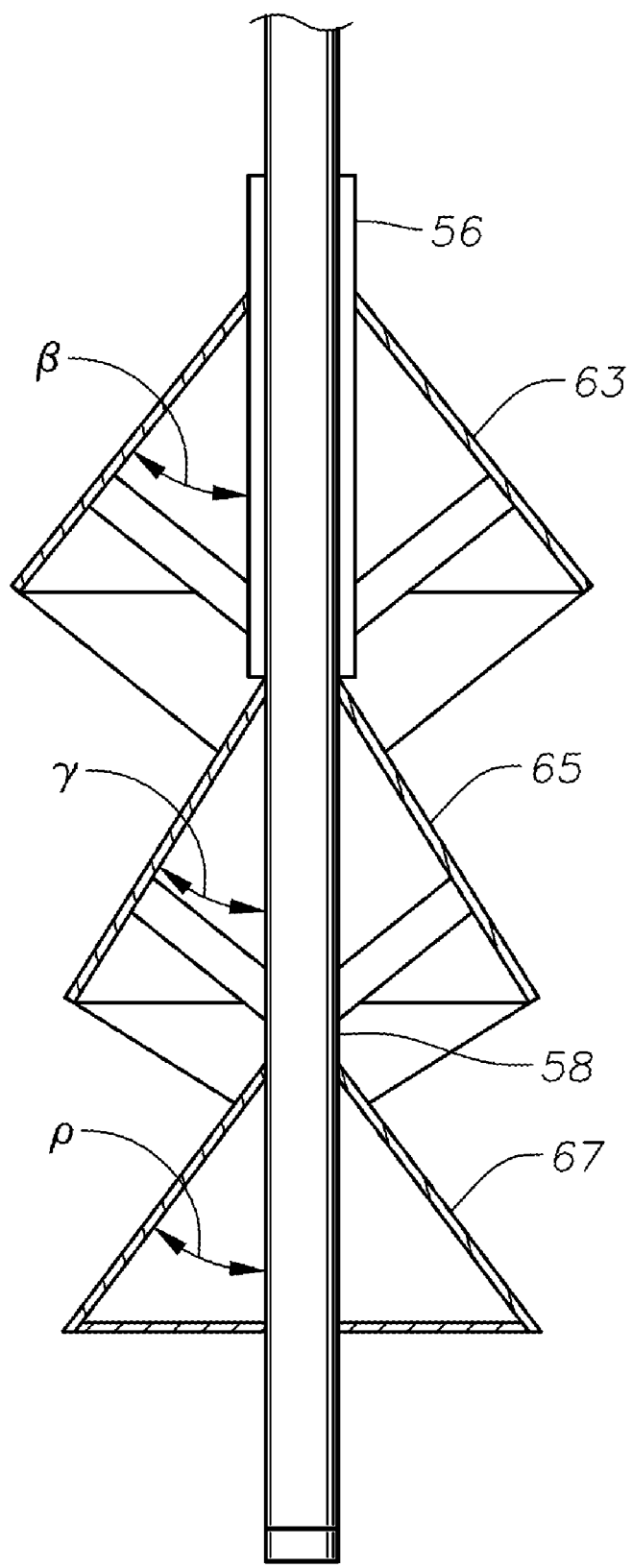

FIGS. 4 and 5 are schematic side elevation views, partially in section, of certain internal features of the embodiment of FIGS. 1-3. In embodiment 100, upper and lower inverted cones 63, 65 have their peripheral edges positioned away from the inside surface of vessel 2 distances defined by "d" and "$d_2$" (see FIG. 4), respectively, wherein upper inverted cone 63 peripheral edge is located closer to the inside surface of vessel 2 than is the peripheral edge of lower inverted cone 65, so that the ratio $d/d_2$ ranges from about 0.6 to about 0.95, or from about 0.7 to about 0.9, or from about 0.8 to about 0.9. Referring to FIG. 5, upper inverted cone 63 may have a cone angle "β" (relative to vertical) ranging from about 35 to about 45 degrees, or from about 36 to about 40 degrees, while lower inverted cone 65 may have a cone angle "γ" (relative to vertical) ranging from about 25 to about 35 degrees, or from about 28 to about 32 degrees. It is important that β>γ to ensure proper stratification of the filter granular material, in conjunction with the various distances and gaps referred to herein.

In certain embodiments, and as illustrated in embodiment 100 of FIGS. 1-5, the apparatus further comprises a sand cone 67 attached to central pipe 58 below lower inverted cone 65 and terminating above the intake end of airlifting tube 60, sand cone 67 having a sand cone space defined by a bottom plate of central pipe 58, an inner surface of the sand cone, a sand cone bottom plate, and the outer surface of central pipe 58. In certain apparatus (see FIG. 3), sand cone 67 has an outer peripheral edge that is positioned a distance $d_1$ from the inside surface of vessel 2, where $d_1$ ranges from about 1 to about 3 inches, or from about 1.5 to about 3 inches, or from about 2 to about 3 inches, and in certain embodiments about 2.5 inches. In certain embodiments sand cone 67 may have a cone angle "ρ" (relative to vertical) ranging from about 35 to about 45 degrees, or from about 36 to about 40 degrees (see FIG. 5).

FIG. 4 also illustrates schematically a dirtied liquid reject collection tray 76, which is fluidly connected to reject pipe nipple 30 and reject conduit 28. Tray 76 essentially separates washbox 18 into upper and lower halves 18a, 18b in this embodiment, but this is not strictly necessary.

Figure 6A:
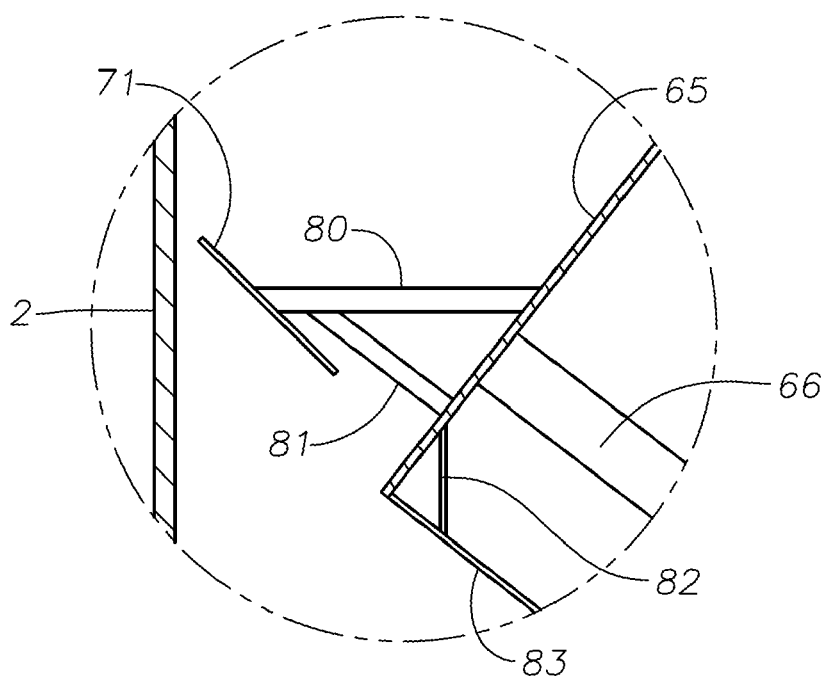
FIGS. 6 and 6A are schematic side elevation views, partially in section, of certain external and internal features of a second filter embodiment.
Figure 6:
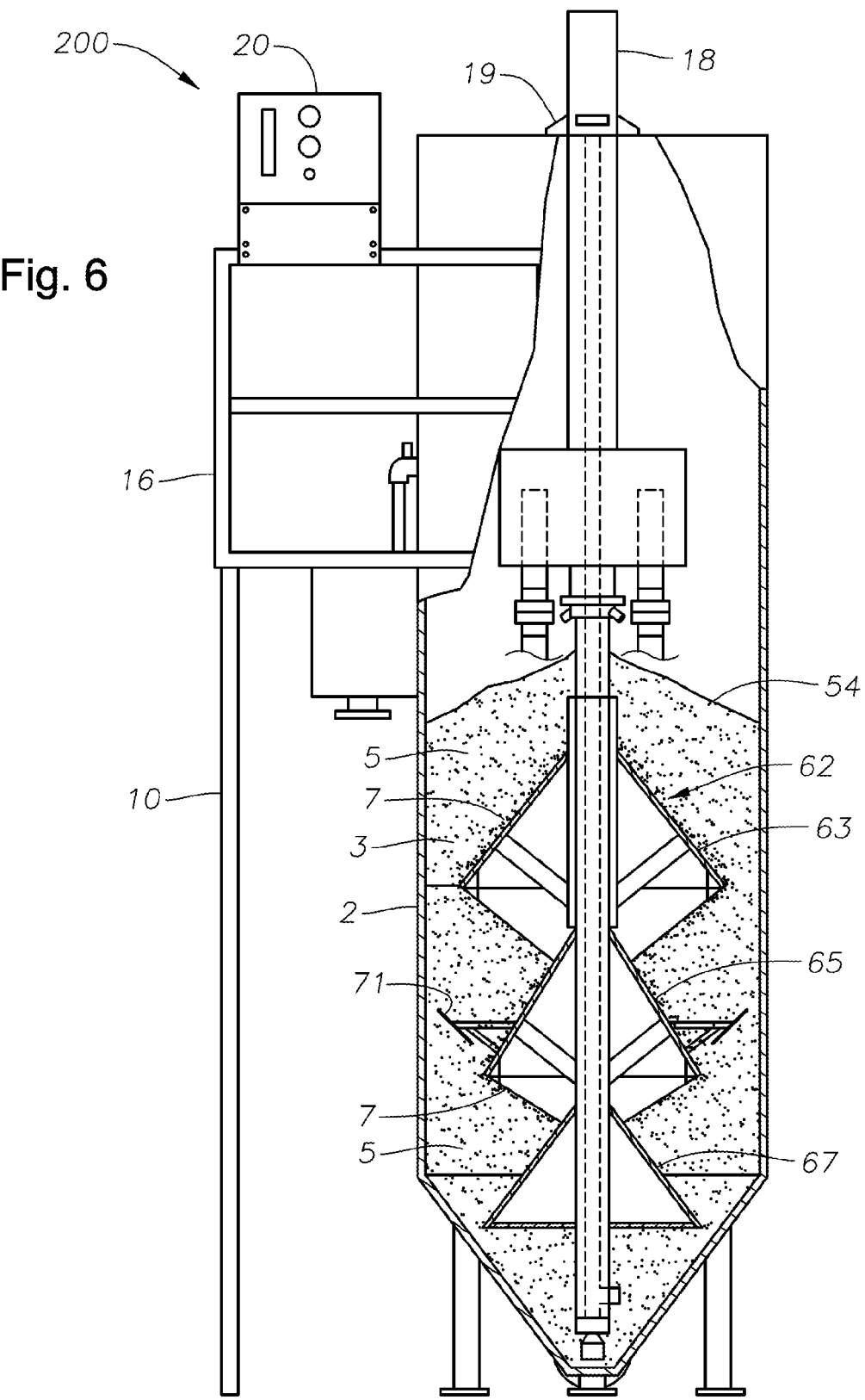

FIGS. 6 and 6A are schematic side elevation views, partially in section, of certain external and internal features of a second filter embodiment in accordance with the present disclosure. In embodiment 200 of FIGS. 6 and 6A, deflector plate 71 is connected to the lower periphery of lower inverted cone 65 and slanted upward from a position near the inner surface of vessel 2 and extending toward but not touching that surface. Support brackets 80, 81 are provided, as well as a diverter plate 83, supported by a vertical plate 82. Vertical plate 82 prevents the hydraulic flow of fine grain sand and garnet to flow toward the center of the filter apparatus of the present disclosure.

The filtration process begins with the entry of the unfiltered liquid into vessel 2 through influent liquid connection 4. The unfiltered liquid descends, due to gravity, through the conical filter media bed 3, toward the bottom of the filter. The unfiltered liquid may be any liquid but will typically be water or wastewater. The liquid intake connection 4 is located in a sidewall of vessel 2 at a point above media bed 3, but not so high as to be above the liquid level, which would cause splashing and air entrainment. Liquid intake connection 4 may be positioned horizontally and tangent to the tank wall to impart a circular motion to the unfiltered liquid. This avoids stagnant zones and keeps floating material from sticking to inside surfaces of vessel 2.

The unfiltered liquid tends to flow through the coarser outer layer rather than through the finer inner layer. Liquids typically follow the path of least resistance. The path of least resistance in this case is through the coarse granule size filter media because the space between granules is large compared to the finer filter media. Thus, the initial filtration of unfiltered liquid is accomplished by the coarse granule size filter media.

The partially filtered liquid is further filtered as it next flows through the interior layer of finer granule size filter media. Contrary to previously known filter apparatus of this type, the liquid then flows directly to effluent chamber 44 through risers 56, 58, and conduits 40, 42 and to effluent collector 44, which collects the filtered liquid. There are no screens or screen cartridges in the filters according to the present disclosure.

In the presently disclosed filter apparatus, central pipe 58 extends along an outside surface of airlifting tube 60 from a position just below the washbox 18 to a position just above the intake end of airlifting tube 60. An effluent riser pipe 56 extends along an outside surface of central pipe 58 from a position just below washbox 18 to a position above its intake end.

The filtered effluent liquid leaves the filtration unit through effluent collector 44 to external exit riser pipe 38. An effluent valve can be used to control or stop the flow of liquid through effluent box 36. The exit riser pipe 38 discharges to an area external from the filter unit. The rate of flow through effluent collector 44 may be controlled by a telescoping valve on exit riser pipe 38, as is taught is assignee's previous U.S. Pat. No. 6,790,351. Any suitable telescoping valve may be used. Suitable telescoping valves include, but are not limited to, those disclosed in U.S. Pat. No. 6,364,179 to Sullivan and U.S. Pat. No. 6,035,892 to Kennedy, both of which are herein incorporated by reference.

The solids captured by the filter media bed 3 are drawn downward with the downflow moving filter media bed 3 into an intake end area 68 of airlift tube 60. The continuous transport of dirtied filter media from the bottom of the filter to washbox 18 is carried out by airlifting tube 60. The performance of the filter unit depends, in great part, on the performance of the airlift. Airlifts themselves are well known in the fields of wastewater treatment and well hydraulics. A conventional airlift pump consists essentially of a vertical tube having its lower end submerged in a liquid or slurry to be pumped. The upper end of the tube discharges the pump material. In the case of the present disclosure, the upwardly transported mixture of dirtied filter media and filtered liquid empties into the washbox 18. The height to which the mixture can be airlifted depends on the efficiency of the airlift system.

The actual pumping or lifting action is achieved by the introduction of air into the lower part of the airlifting tube 68 which also contains a mixture of filtered liquid and dirtied filter media. Any suitable airlifting means may be used in the airlifting tube 60 of the present disclosure. Suitable airlift means include, but are not limited to, those disclosed in U.S. Pat. No. 6,319,413 to Xia et al., U.S. Pat. No. 5,730,886 to Wachinski et al., and U.S. Pat. No. 5,582,722 to Wachinski et al., all of which are herein incorporated by reference. Intake end 68 may have a bell-shaped bottom 69 to increase the pumping rate of the airlift. Thus, more filtered water, filter media, and dirt can be pumped to the top of the filtration unit without increasing the air supply requirement.

Any suitable washbox design may be used in filter apparatus of the present disclosure. One useful embodiment, described with reference to FIG. 3 of the '351 patent, is a one-stage washbox. The higher density filter media settles into the washbox skirt area 76. In this area, the unfiltered liquid flows up from the bottom of the washbox skirt 76 via inlet tubes 72.

In an alternative embodiment, washbox 18 may be a two-stage cleaning washbox apparatus as depicted in FIG. 2 of the '351 patent. The two-stage cleaning washbox includes a filter media shield hood which deflects the filtered liquid and dirtied filter media downwardly onto a separation cone. This downward deflection efficiently washes dirt granules and solids from the filter media, along with the filtered liquid. The solids concentrated liquid from the airlift drops on an inclined porous surface of the separation cone and passes through the surface of separation cone into a dirtied liquid reject collecting tray. The dewatered, partially cleaned, filter media moves down along the surface of the separation cone and falls into a washbox filter media liquid separation area and eventually into the washbox skirt and is washed clean of filtered granules as described in the above-mentioned one-stage washbox by unfiltered liquid, now wash liquid, entering into washbox skirt.

Figure 7:
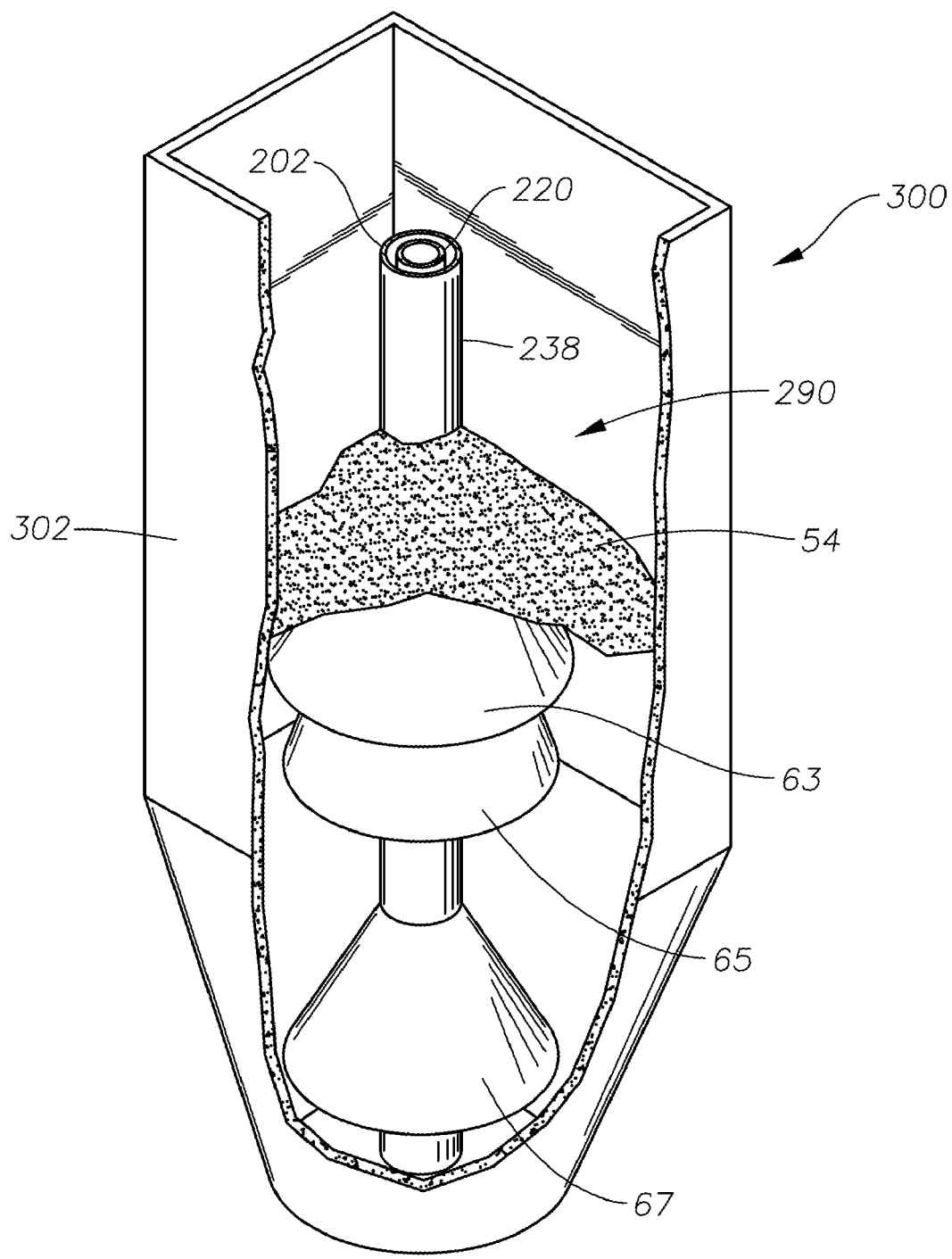
FIG. 7 is a perspective view, with portions cut away, of another filter embodiment.

In other embodiments of the present disclosure, the present liquid filtering apparatus may be used for "in-ground" installations, typically in new or existing concrete basins. This embodiment avoids the difficulty of piping the effluent out of the basin at a low level. This embodiment avoids designs that require the effluent to be removed via a pipe that exits through a side wall of the vessel. Such a design is particularly inconvenient in a poured concrete tank, especially if the concrete is an existing installation being converted to a vertical downflow moving bed sand filter. As illustrated in embodiment 300 of FIG. 7, this embodiment illustrates a concrete basin 302, and solves the effluent exit problem by bringing the effluent up through the center of a filter assembly 290 by means of concentric pipes, effluent riser pipe 238, and central pipe 220. The effluent passes upward and out of filter assembly 290 in effluent chamber 202, formed in the annulus between central pipe 220 and effluent riser pipe 238.

The specifics of operating reject box 26 is fully discussed in assignee's '351 patent and only summarized here. The wash liquid discharges out of washbox housing via reject outlet pipe 30 to a reject box 26. A valve 32 on reject outlet pipe 30 may be used to adjust the flow rate of the wash liquid into reject box 26. This may be used to conserve washing liquid that will have to be recycled through the filter plant. Reject outlet pipe 30 fluidly connects with a reject line inlet (not illustrated), which allows wash liquid to enter reject box 26. Reject box 26 has a weir volume space defined by a bottom, a riser side, and a weir plate. Reject box 26 also includes an outlet side. The height of weir plate may be adjusted to vary the volume of weir volume space. The weir plate may include a V-shaped notch along a top side, acting to regulate and gauge the flow of wash liquid out of the weir volume space. The flow of wash liquid is the reject flow rate. Once wash liquid passes over the weir plate it exits reject box 26 by way of outlet conduit 28 and is carried away.

Liquid, typically water or waste water, may be filtered using the present liquid filtering apparatus. In order to filter liquid, a bed of filtration material, usually sand, comprising granules of different sizes, including large granules and fine granules, is provided within a vessel. The bed typically has a general conical configuration. An unfiltered liquid, typically water or wastewater, is introduced above the bed and is filtered through the bed in a generally downward direction. The filtered liquid passes into an effluent chamber, as described above without the use of cartridge screens, to form a collection of filtered liquid. The collection of filtered liquid is removed from the effluent chamber by way of an effluent collector, the flow through which is controlled by a ball valve or telescoping valve as discussed above.

More specifically, the novel filter apparatus works as follows, using sand and garnet as an example only, it being realized and understood that other combinations of coarse and fine-grained granules may be employed equally as well:

1. Dirty water or wastewater influent is introduced near the top of filter bed 3. Then the influent passes through the outer coarse sand and progresses through increasingly finer sand media and the finest garnet media before entering the effluent zone. During that process, the solids originally in filter influent are captured in the filter media. The coarse (i.e., larger grained) to fine graded sand does the rough filtration in zones 5 and the finest (i.e. smallest sized grains) garnet layer does the final polishing in zones 7 (see FIGS. 3 and 6).
2. The purified filter effluent flows into a filtrate collection effluent riser 56 and out effluent conduit 42 where it is directed to an effluent box 36 from where the filter effluent exits the filter.

3. The captured solids are drawn downward with the mixed media to the bottom of the filter through the suction of the airlifting tube 60, which lifts the media and contaminants to washbox 18, where solids are separated from the media surface and directed to a reject box 26. The reject exits the filter from the reject box.

4. The washbox 18 provides counter-current washing and gravity separation of the cleaned media and concentrated waste solids. Solids removal from the washbox is accomplished as a continuous reject stream of water and solids is withdrawn from the top of the washbox. This pulls a small portion of influent flow up into the bottom of the washbox in an attempt to equalize the differential water level between the filter vessel 2 and washbox 18. The upward high velocity of the water keeps the low density solids in suspension so they can be sluiced away to the reject box 26; while the high density sand is capable of settling through the countercurrent flow to the top of the filter bed 3.

5. The coarse to fine sand gradation naturally occurs as the cleaned media falls back from washbox 18 to the top of filter bed 3. The coarsest sand stratifies to the outside perimeter, generally zone 5, while the finest garnet remains at or near the center of the filter, zone 7. The finest garnet grains are guided by a baffle system which keeps the finest garnet grains in the inner area of the filter bed, so that the garnet grains always remain at the final polishing zone of the filter bed. The baffle system creates two inverted cone-shaped garnet grain zones 7 which are directly connected to the filter effluent zone. There are no filtrate screens used between them. The high density of the garnet grains prevents them from being fluidized and carried over to the effluent zone.

The present disclosure has been described with reference to certain embodiments. Obvious modifications and alterations will occur to others upon reading and understanding the preceding detailed description. It is intended that the disclosure be construed as including all such modifications and alterations insofar as they come within the scope of appended claims or the equivalents thereof.

The invention claimed is:

1. A continuous, screenless, self-cleaning liquid filtering apparatus comprising:

a vessel having a bed of filtration material, an intake for introducing unfiltered liquid into an upper region of the vessel, a washbox assembly comprising an airlifting tube extending from the washbox comprising an expulsion end within the washbox and an intake at a lower end opposite from the washbox, a reject outlet pipe fluidically communicating the washbox with a reject box;

a central pipe extending along an outside surface of the airlifting tube from a position just below the washbox to a position just above the intake end; an effluent riser pipe extending along an outside surface of the central pipe from a position just below the washbox to a position above the intake end;

first and second effluent chambers, the first effluent chamber defined by an outer surface of the effluent riser pipe, a bottom plate of an upper inverted cone, and an inner surface of the upper inverted cone, and the second effluent chamber defined by an outer surface of the central pipe, a bottom plate of a lower inverted cone, and an inner surface of the lower inverted cone, the upper and lower inverted cones being substantially concentric and vertically spaced apart components of a baffle assembly, the upper inverted cone connected to the outer surface of the effluent riser pipe and fluidly connected to the first effluent chamber, the lower inverted cone connected nearer to the bottom of the effluent riser pipe than the upper inverted cone and fluidly connected to the second effluent chamber;

an effluent collector fluidically communicating the effluent chambers with a location outside of the liquid filtering apparatus; and a deflector connected either to an internal surface of the vessel or to a lower periphery of the lower inverted cone, a flow region being defined between the deflector and lower periphery of the lower inverted cone.

2. The liquid filtering apparatus according to claim 1, wherein the filtration material is stratified so that the unfiltered liquid first contacts coarse grained filtration material and then finer grained filtration material.

3. The liquid filtering apparatus according to claim 2, wherein the coarse filtration material is selected from the group consisting of sand, anthracite, ceramic beads and granular activated carbon, and the finer grained filtration material is one or more species of garnet.

4. The liquid filtering apparatus of claim 3, wherein the species of garnet are selected from the group consisting of minerals within the general formula:

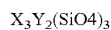

and combination thereof,
wherein
X is a divalent cation selected from the group consisting of $Ca^{2+}$, $Mg^{2+}$, and $Fe^{2+}$, and
Y is a trivalent cation selected from the group consisting of $Al^{3+}$, $Fe^{3+}$, and $Cr^{3+}$.

5. The liquid filtering apparatus of claim 2, wherein the stratification is such that the finer grained filtration material is positioned in a polishing zone between the coarse grained filtration material and outside surfaces of the vertically spaced apart upper and lower inverted cones.

6. The liquid filtering apparatus of claim 2, wherein the coarse grained filtration material comprises a zone of initial filtration of gradually diminishing granule size, starting from coarsest granules at an initial fluid contact layer having granule size not less than 0.5 mm, the grains progressively becoming smaller to a granule size of not less than 0.3 mm and not more than 3.0 mm.

7. The liquid filtering apparatus of claim 6, wherein the finer grained filtration material comprises a polishing zone of one or more species of garnet of gradually diminishing granule size, starting from coarsest garnet having granule size not less than 0.15 mm, the garnet grains progressively becoming smaller to a granule size of not less than 0.1 mm and not more than 1.0 mm.

8. The liquid filtering apparatus of claim 1, wherein the deflector is connected to the inner surface of the vessel via a support bracket and slanted downward from a position near the inner surface of the vessel and extending toward but not touching the lower periphery of the lower inverted cone.

9. The liquid filtering apparatus of claim 8 wherein the deflector has a deflector angle α ranging from about 45 to about 55 degrees, as measured in reference to horizontal, wherein an upper terminus of the deflector is positioned a distance "$g_1$" about 0.5 to about 2 inches away from an inside surface of the vessel, wherein a lower terminus of the deflector is positioned horizontally away from the peripheral edge of the lower inverted cone by a distance "$g_2$" ranging from about 0.5 to about 1.5 inches, and the lower terminus of the deflector is separated from the plane of the lower inverted cone by a distance "$g_3$" ranging from about 2 to about 3 inches.

10. The liquid filtering apparatus of claim 1, wherein the deflector is connected to the lower periphery of the lower inverted cone via a support bracket and slanted upward from a position near the inner surface of the vessel and extending toward but not touching the inner surface of the vessel.

11. The liquid filtering apparatus of claim 1 wherein the upper and lower inverted cones each comprise a peripheral edge positioned away from an inside surface of the vessel distances defines by "d" and "$d_2$", respectively, the upper inverted cone peripheral edge located closer to the inside surface of the vessel than the peripheral edge of the lower inverted cone.

12. The liquid filtering apparatus of claim 11 wherein d and $d_2$ are related such that a ratio $d/d_2$ ranges from about 0.6 to about 0.95.

13. The liquid filtering apparatus of claim 1 wherein the upper inverted cone comprises a cone angle β relative to vertical ranging from about 35 to about 45 degrees.

14. The liquid filtering apparatus of claim 13 wherein the lower inverted cone comprises a cone angle γ relative to vertical ranging from about 25 to about 35 degrees.

15. The liquid filtering apparatus of claim 14 wherein β>γ to ensure proper stratification of the filtration material.

16. The liquid filtering apparatus of claim 1 comprising a sand cone attached to the central pipe below the lower inverted cone and terminating above the intake end of the airlifting tube, the sand cone having a sand cone space defined by a bottom plate of the central pipe, an inner surface of the sand cone, a sand cone bottom plate, and the outer surface of the central pipe, the sand cone comprising has an outer peripheral edge that is positioned a distance $d_1$ from the inside surface of the vessel, where $d_1$ ranges from about 1 to about 3 inches.

17. The liquid filtering apparatus of claim 16 wherein the sand cone comprises a cone angle ρ relative to vertical ranging from about 35 to about 45 degrees.

18. The liquid filtering apparatus of claim 1, wherein the effluent collector is positioned above the vessel.

19. The liquid filtering apparatus of claim 1, wherein the airlifting tube is disposed in a generally centered position within the central pipe by way of one or more internal guide vanes.

20. The liquid filtering apparatus of claim 1, wherein the vessel is an existing basin with no installed piping, the liquid filtering apparatus is retrofitted to the existing basin, and no holes are cored into the existing basin.

* * * * *